Patented Jan. 23, 1968

3,365,306
MEAT FLAVORING COMPOSITIONS

Marcel Andre Perret, Greenwich, Conn., assignor to Chas. Pfizer & Co., Inc., New York, N.Y., a corporation of Delaware
No Drawing. Continuation-in-part of application Ser. No. 402,922, Oct. 9, 1964. This application Feb. 11, 1966, Ser. No. 526,718
9 Claims. (Cl. 99—140)

This invention relates to new and useful flavoring compositions. More particularly, it is concerned with mixtures comprising reaction products of sugars with amino acids, vegetable protein hydrolysates and 5'-ribonucleotides, which are useful in imparting a beef-type flavor to foods.

The subject application is a continuation-in-part of copending application Ser. No. 402,922, filed Oct. 9, 1964, now abandoned.

The beef flavor in many commercially-available foods such as soups and gravies is obtained by the incorporation therein of a product known as beef extract. Beef extract is prepared by a time-consuming and expensive process which generally comprises acid hydrolysis of the meat tissue from slaughtered cattle. In a commonly employed commercial procedure, the meat is hydrolyzed and then the mixture is neutralized and concentrated until the liquid portion has largely evaporated and there remains a brown and substantially completely hydrolyzed residue, the so-called beef extract. This procedure is expensive in that it requires fairly large equipment and much heat to convert a large quantity of beef tissue into the relatively small quantity of concentrated extract which is finally obtained.

Beef extract is a commodity which normally is imported into the United States from areas where meat is relatively low in cost and the processing expenses are minimized. As with many imported commodities, the price of beef extract tends to fluctuate with the season of the year and is sometimes affected by the competitive demand for cuts of meat for table use. Furthermore, it is noticed that the quality of the extract tends to vary since the manufacturers are forced at times to use predominantly poorer cuts of meat for extract preparations. This generally results when prevailing market conditions force prices of the better cuts too high. As a result of these problems, means have long been sought to free food processors from dependence on beef extract. It has now been found that through use of the flavoring compositions of the instant invention it is possible to dispense with beef extract in the preparation of beef flavored foods. This is accomplished by replacing beef extract with compositions prepared from commercially-available chemical and vegetable materials which are stable in price and some of which are expected to be available at steadily decreasing prices in the future. A particularly important advantage of the new compositions is found in comparison of their price with that of beef extract, the use of beef extract in the preparation of foods costs about three times as much as the use of the flavoring compositions for this invention.

It is, therefore, a principal object of the instant invention to provide beef-flavored composition which can replace all or part of beef extract in food.

A further object of this invention is to provide compositions for obtaining meatless beef-flavored foods at a substantial savings in cost.

A still further object of this invention is to provide flavoring compositions which are of uniform quality, readily available in all seasons and economical to use.

These and other objects of the instant invention are readily obtainable through use of the composition of this invention which is, in essence:

(a) The beef-flavored substance formed by heating a compound selected from the group consisting of hexose and pentose monosaccharides with cysteine and cystine in the presence of water;

(b) Vegetable protein hydrolysate in an amount to provide from about 3 to about 15 parts by weight per part of said beef-flavored substance; and (c) A 5'-ribonucleotide selected from the group consisting of inosinic acid, guanylic acid, physiologically-acceptable salts thereof and mixtures of these in an amount to provide from about 0.02 to about 1.5 parts by weight per part of said beef-flavored substance.

Special mention is made of an embodiment of this invention, which provides an especially pleasing and well-balanced beef-flavor: a composition as defined hereinabove which includes a compound selected from the group consisting of glutamic acid and physiologically-acceptable salts thereof in an amount to provide from about 2 to about 15 parts by weight per part of said beef-flavored substance.

Also contemplated by the instant invention is an embodiment wherein the said hexose is dextrose and the said pentose is arabinose. This provides compositions with an excellent balance of flavor and economy.

Still another embodiment contemplated by the instant invention is the mild-flavored composition as defined hereinabove, wherein for each part by weight of beef-flavored substance there is provided from about 0.05 to about 0.5 part of alanine and of glycine.

A further embodiment of the instant invention, with especially mild flavor and a lack of bitterness when used in high concentrations, is a composition as defined hereinabove wherein for each part by weight of said beef-flavored substance there is provided from about 1 to about 4 parts of sucrose.

An embodiment of the instant invention which has been found by taste panel testing to be fully equivalent to beef extract in every respect comprises:

(a) The beef-flavored substance formed by heating dextrose and arabinose with cysteine or cystine in the presence of water;

(b) Vegetable protein hydrolysate in an amount to provide from about 3 to about 15 parts by weight per part of said beef-flavored substance;

(c) Monosodium glutamate in an amount to provide from about 2 to about 15 parts by weight of said beef-flavored substance;

(d) Sucrose in an amount to provide from about 1 to about 4 parts by weight per part of said beef-flavored substance;

(e) Alanine and glycine, each in an amount to provide from about 0.05 to about 0.5 part by weight per part of said beef-flavored substance; and (f) A mixture consisting of about 1 part of inosinic acid per part by weight of guanylic acid, said mixture being present in an amount to provide from about 0.02 to about 1.5 parts by weight per part of said beef-flavored substance.

The ingredients of the above mentioned compositions are readily obtainable either commercially, or by synthesis.

With respect to the "beef-flavored substance," designated (a) the teachings of Morton et al., U.S. 2,934,437, and of the examples herein, are illustrative.

The monosaccharide used to make the beef-flavored substance may be a pentose or a hexose or mixtures of both. Illustrative pentoses are ribose, arabinose, xylose and the like; illustrative hexoses are glucose, dextrose, fructose and the like.

The term "vegetable protein hydrolysate" as used herein contemplates artificial digests of protein derived by acid, enzymatic or other hydrolysis of vegetable proteins such as the mixture of plant proteins occurring in cereal grains, especially wheat, and known as gluten. The said protein hydrolysates, which are freely available commercially, comprise the constituent amino acids representative of the source protein.

The term "physiologically-acceptable salts" as used herein and in the appended claims contemplates non-toxic alkali metal, alkaline earth metal and organic base salts of 5'-ribonucleotides, of which inosine-5'-phosphoric acid, also well known in the art as inosinic acid, is a member of special importance, and glutamic acid. Particular mention is made of the sodium and calcium salts, which are desirable because of their ready availability and low toxicity. Also important are the potassium salts, the ammonium salts and the salts with glycine and other non-toxic organic bases.

It has been found that, in addition to, or in place of inosinic acid, other 5'-ribonucleotides may be employed in the practice of the instant invention. In this connection, special mention is made of certain 5'-ribonucleotides derivable from a commonly employed source of inosinic acid, namely, yeast ribonucleic acid: cytidine-5'-phosphoric acid, uridine-5'-phosphoric acd and guanosine-5'-phosphoric acid; this latter substance commonly is referred to as guanylic acid.

It is critical to this invention that there be present all three ingredients set forth hereinabove; the beef-flavored substance, the vegetable protein hydrolysate and the 5'-ribonucleotide, in order for the composition to serve adequately as a replacement for beef extract. For example, in taste panel testing of the replacement of beef extract in a soup-base with the novel compositions, the herein disclosed and claimed mixture is completely acceptable while mixtures without the vegetable protein hydrolysate and mixtures without the 5'-nucleotides are decidedly bitter and not an adequate replacement at all.

For the practice of this invention it is important to maintain the ratio of vegetable protein hydrolysate to beef-flavored substance as disclosed herein and as set forth in the appended claims. If more than about 15 parts by weight of hydrolysate per one part of beef-flavored substance is used, then the beef taste is not as pronounced anymore. If, on the other hand, the amount of hydrolysate is such as to provide less than about 3 parts per part of beef-flavored substance, there begins to be noticed a distinctly bitter flavor note.

Also, in the practice of this invention it is very desirable to maintain the ratio of 5'-ribonucleotide to beef-flavored substance as disclosed herein. If more than 1.5 parts by weight of the said nucleotide are present for each part of the beef-flavored substance, the economic advantage of the instant invention is diminished, and if less than 0.02 part of the nucleotide are present per part of the beef-flavored substance, there begins to be noticed a tendency for the beef flavor to be reduced.

It is found that a particularly effective ratio for a beef extract type preparation with well-balanced mild flavor and economy is 1:5:0.30 parts of beef-flavored substance per part of vegetable protein hydrolysate per part of 5'-ribonucleotide, respectively.

As will be exemplified hereinafter, the flavoring compositions are obtained and may be used in the form of substantially dry solids or pastes or in solutions. When the flavoring compositions are used as replacements for beef extract, a certain amount of adjustment in the concentration may be needed depending on individual preference and the nature of the final product in order to arrive at the most desirable flavor or essence. These adjustments are well within the ability of those skilled in the art and, as is obvious, the need for such adjustments by the consumer is largely obviated by providing a synthetic mixture of this invention with a flavoring strength equivalent to that of beef extract. Such a composition can readily be made by suitable selection of concentrations and will be exemplified hereinafter.

The instant invention, in one of its embodiments especially useful to prepare beef-flavored gravy with roast meat flavor and odor, contemplates a composition as defined above wherein for each part of the said beef-flavored substance there is provided from about 0.5 to about 15 parts of edible fat.

As will be exemplified, to obtain the strongest roast meat flavor, it is desirable to heat the other ingredients with the aforementioned beef-flavored substance to a temperature of from about 70° C. to about 100° C. for a period of from 10 minutes to about 4 hours. As will be obvious to those skilled in the art, the higher the temperature chosen, the shorter the time required to obtain an adequate flavor. As excellent beef-flavored food is also prepared by heating the beef extract replacement with the final food.

With respect to the edible fat, both animal and vegetable fats may be used. For example, pork fat and beef fat, margarine, butter and safflower oil, and the like, can be employed. While the reactions leading to roast meat odor and flavor are not clearly understood, the heating together of the mixture with fat under these conditions leads to a very pleasing product, different from that obtained when fat is not present.

The amount of edible fat can be varied. Based on the beef-flavored substance, for example, there can be used from about 0.5 to about 15 parts of fat per part of beef-flavored substance or even more. An especially pleasing result is obtained when there is provided 8 parts of fat per part of beef-flavored substance.

A convenient method of combining the ingredients to form the instant novel composition comprises:

(a) Heating in admixture a compound selected from the group consisting of hexose and pentose monosaccharides with an amino acid selected from the group consisting of cystine and cysteine in the presence of water until a beef-flavored mixture is obtained and (b) Adding for each part by weight of said beef-flavored mixture from about 3 to about 15 parts of vegetable protein hydrolysate and from about 0.02 to about 1.5 parts of a 5'-ribonucleotide as defined above and heating for about two hours at at least 70° C.

The beef-flavored substance is formed conveniently by mixing cysteine with about 4 to 4½ parts by weight of monosaccharide and about 5 parts of water, heating to 90–100° C. for 2 hours, cooling to 55° C. and adjusting to about pH 6.9 with 50% aqueous NaOH. This is then treated with about one-half its weight of water and the vegetable protein hydrolysate and 5'-nucleotide are added, then the mixture is heated for about 2 hours at 70° C., cooled and homogenized to obtain a heavy, honey-like paste in an especially convenient form for consumer use.

The following examples are illustrative of the novel compositions of the instant invention. They are not intended to limit the inventive compositions, many variations of which are possible.

*Example I*

A beef-flavored composition is prepared by adding 25 ml. of water to a mixture of 12.5 g. of dextrose, 9.75 g. of arabinose and 6.5 g. of cysteine hydrochloride, heating the mixture to 100° C. for 2 hours, cooling to 55° C., adjusting from pH 3.2 to pH 6.9 with 50% aqueous sodium hydroxide, adding 35 ml. of water, 275 g. of vegetable protein hydrolysate and 18 g. of a mixture of 1 part of inosinic acid per part by weight of guanylic acid, then heating for 2 hours at 70° C., cooling and stirring until a smooth, honey-like consistency is obtained.

Example II

A beef-flavored composition is obtained by dissolving 12.05 g. of dextrose, 9.75 g. of arabinose, 9.75 g. of monosodium glutamate, 6.5 g. of cysteine, 4.65 g. of alanine and 3.3 g. of glycine in 300 ml. of water. The mixture is heated at 100° C. with vigorous stirring for two hours, then is neutralized to pH 6.7 with 30.5 cc. of 10% aqueous NaOH. The mixture is concentrated at 75–80° C. until there is obtained a beef-flavored substance with the consistency of honey and a dark brown color.

The beef-flavored substance, 261.3 g. of vegetable protein hydrolysate, 59.75 g. of sucrose and 97.80 g. of monosodium glutamate and 17.15 g. of a mixture of 1 part of inosinic acid per part by weight of guanylic acid are dissolved in 500 ml. of water and heated at 100° C. with vigorous stirring for 6 hours. The substance is cooled and is suitable as a replacement for beef extract.

Example III

A beef-flavored composition eminently suitable for preparing gravy with a roast meat odor and flavor is prepared by the procedure of Example II, adding 200 g. of prime beef fat to the 500 ml. of water before the final heating step. After heating at 100° C. for 6 hours, 165 g. of fat is skimmed off leaving the product, 689 g., including 118 g. of water, which can be used to make gravy.

Example IV

Beef-flavored compositions are prepared by the procedure of Example I, substituting for the dextrose the following hexoses: glucose and fructose; and for the arabinose the following pentoses: ribose and xylose. Substantially the same results are obtained.

Example V

Beef-flavored compositions are prepared by the procedure of Example I, substituting respectively for the mixture of inosinic acid and guanylic acid, disodium inosinate, dipotassium inosinate, calcium inosinate, di-ammonium inosinate and a 1:1 by weight mixture of disodium inosinate and disodium guanylate. Beef-flavored compositions are prepared when glutamic acid, monopotassium glutamate, monocalcium di-glutamic acid and monoammonium glutamate are substituted for the monosodium glutamate of Example I.

Example VI

The procedure of Example III is repeated substituting for the beef fat an amount of margarine to provide 8 parts by weight based on the beef-flavored substance. An eminently satisfactory gravy base is obtained.

Example VII

The procedure of Example II is repeated substituting for the amino acids, sugars, vegetable protein hydrolysate and 5'-ribonucleotides at the ratios set out a series of compositions providing different ratios. Satisfactory beef-flavored compositions are obtained with the following tabulated mixtures:

TABLE I.—FLAVORING COMPOSITIONS

| Arabinose-dextrose-cysteine,[1] parts | Veg. protein hydrolysate, parts | 5'-ribo-nucleotide parts | Alanine parts | Glycine parts | Sucrose parts | MSG[2] parts |
|---|---|---|---|---|---|---|
| 1 | 10 | 0.65 | 0.18 | 0.09 | 2.3 | 7.65 |
| 1 | 10 | 0.65 | 0.18 | 0.09 | 2.3 | 5.0 |
| 1 | 10 | 0.65 | 0.18 | 0.09 | 2.3 | 15.0 |
| 1 | 5 | 0.65 | 0.18 | 0.09 | 2.3 | 7.65 |
| 1 | 15 | 0.65 | 0.18 | 0.09 | 2.3 | 7.65 |
| 1 | 10 | 0.50 | 0.18 | 0.09 | 2.3 | 7.65 |
| 1 | 10 | 1.5 | 0.18 | 0.09 | 2.3 | 7.65 |
| 1 | 10 | 0.65 | 0.05 | 0.09 | 2.3 | 7.65 |
| 1 | 10 | 0.65 | 0.5 | 0.09 | 2.3 | 7.65 |
| 1 | 10 | 0.65 | 0.18 | 0.05 | 2.3 | 7.65 |
| 1 | 10 | 0.65 | 0.18 | 0.5 | 2.3 | 7.65 |
| 1 | 10 | 0.65 | 0.18 | 0.09 | 1.0 | 7.65 |
| 1 | 10 | 0.65 | 0.18 | 0.09 | 4.0 | 7.65 |
| 1 | 3 | 0.30 | 0.18 | 0.09 | 1.2 | 3.0 |
| 1 | 5 | 0.30 | 0.10 | 0.05 | 1.2 | 7.65 |
| 1 | 5 | 0.30 | 0.10 | 0.05 | 1.2 | 4.0 |
| 1 | 3 | 0.2 | 0.10 | 0.05 | 1.2 | 4.0 |
| 1 | 3 | 0.2 | 0.05 | 0.05 | 1.2 | 2.0 |
| 1 | 3 | 0.02 | 0.05 | 0.05 | 1.0 | 2.0 |

[1] Combined weight of beef-flavored substance.
[2] MSG—Monosodium glutamate.

Example VIII

The procedure of Example III is repeated substituting the flavoring compositions in Table I, Example VII and using, respectively, 0.5 and 15 parts of prime beef fat per part of arabinose-dextrose-cysteine mixture. Beef-flavored gravy bases with roast meat odor and flavor are obtained.

Example IX

A beef-flavored composition is obtained by dissolving 13.30 g. of cysteine hydrochloride, 33.24 g. of dextrose, 26.09 g. of arabinose, 26.09 g. of monosodium glutamate, 6.65 g. of glycine hydrochloride and 13.30 g. of alanine in 66.48 grams of water. The mixture is heated to 90° C. and maintained at this temperature with vigorous stirring for two hours. The mixture is cooled to 20° C. and 99.71 grams of water are added. The mixture is neutralized to pH 6.8 with 12.8 ml. of a 50% aqueous sodium hydroxide solution. To the beef-flavored substance obtained, are added with rapid agitation, 166.19 g. sucrose, 531.80 g. monosodium glutamate, 99.71 g. beef fat and 731.23 g. of vegetable protein hydrolysate. The mixture is heated with vigorous stirring to 70° C. and maintained at that temperature for four hours. The mixture is then cooled to between 50 and 55° C. and 39.89 g. of a 50:50 weight mixture of disodium inosinate and disodium guanylate are added. The mixture is blended for fifteen minutes and a composition suitable for flavoring foods is obtained.

Example X

The procedure of Example IX is repeated substituting 39.89 g. of disodium guanylate for the 50:50 weight mixture of disodium inosinate and disodium guanylate. A composition suitable for flavoring foods is obtained.

Example XI

The procedure of Example IX is repeated substituting 13.30 grams of cystine for cysteine. A composition suitable for flavoring foods is obtained.

What is claimed is:
1. A flavoring composition comprising:
(a) the beef-flavored substance previously formed by heating a compound selected from the group consisting of hexose and pentose monosaccharides with an amino acid selected from the group consisting of cystine and cysteine in the presence of water;

(b) vegetable protein hydrolysate in an amount to provide from about 3 to about 15 parts by weight per part of said beef-flavored substance, and (c) a 5'-ribonucleotide selected from the group consisting of inosinic acid, guanylic acid, physiologically-acceptable salts thereof and mixtures of these in an amount to provide from about 0.02 to about 1.5 parts by weight per part of said beef-flavored substance.

2. A flavoring composition as defined in claim 1, which includes glutamic acid and physiologically-acceptable salts thereof in an amount to provide from about 2 to about 15 parts by weight per part of said beef-flavored substance.

3. A flavoring composition as defined in claim 1 wherein said hexose is dextrose and said pentose is arabinose.

4. A flavoring composition as defined in claim 1 wherein for each part by weight of beef-flavored substance there is provided from about 0.05 to about 0.5 part of alanine and of glycine.

5. A flavoring composition as defined in claim 1 wherein for each part by weight of said beef-flavored substance there is provided from about 1 to about 4 parts of sucrose.

6. A flavoring composition as defined in claim 1 wherein for each part of said beef-flavored substance there is provided from about 0.5 to about 15 parts of edible fat.

7. A flavoring composition comprising:
(a) the beef-flavored substance previously formed by heating dextrose and arabinose with cysteine in the presence of water at about 90 to 100° C. and then cooling to at least about 55° C. and neutralizing;
(b) vegetable protein hydrolysate in an amount to provide from about 3 to 15 parts by weight per part of said beef-flavored substance;
(c) monosodium glutamate in an amount to provide from about 2 to about 15 parts by weight of said beef-flavored substances;
(d) sucrose in an amount to provide from about 1 to about 4 parts by weight per part of said beef-flavored substance;
(e) alanine and glycine, each in an amount to provide from about 0.05 to about 0.5 part by weight per part of said beef-flavored substance; and
(f) a mixture consisting of about 1 part of inosinic acid per part by weight of guanylic acid, said mixture being present in an amount to provide from about 0.02 to about 1.5 parts by weight per part of said beef-flavored substance.

8. A flavoring composition as defined in claim 7 wherein there is present edible fat in an amount to provide from about 0.5 to about 15 parts by weight per part of said beef-flavored substance.

9. A flavoring composition comprising 0.3 part of a 50/50 by weight mixture of disodium guanylate and disodium inosinate, 5.3 parts of vegetable protein hydrolysate, 4 parts of monosodium glutamate, 0.7 part of edible fat, 0.1 part of alanine, 0.05 part of glycine hydrochloride and 1.2 parts of sucrose for each part by weight of a beef-flavored substance previously formed by heating dextrose and arabinose with cysteine in the presence of water at about 90 to 100° C. for about 2 hours, cooling to at least about 55° C. and neutralizing with aqueous alkali.

References Cited

UNITED STATES PATENTS

| | | | |
|---|---|---|---|
| 2,934,437 | 4/1960 | Morton et al. | 99—140 |
| 3,104,171 | 9/1963 | Sakaguchi et al. | 99—140 |

A. LOUIS MONACELL, *Primary Examiner.*

H. H. KLARE, *Assistant Examiner.*